United States Patent
McCloskey et al.

(10) Patent No.: US 8,873,810 B2
(45) Date of Patent: Oct. 28, 2014

(54) FEATURE-BASED METHOD AND SYSTEM FOR BLUR ESTIMATION IN EYE IMAGES

(75) Inventors: Scott McCloskey, Minneapolis, MN (US); Jan Jelinek, Plymouth, MN (US); Kwong Wing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1191 days.

(21) Appl. No.: 12/421,263

(22) Filed: Apr. 9, 2009

(65) Prior Publication Data

US 2010/0220898 A1 Sep. 2, 2010

Related U.S. Application Data

(60) Provisional application No. 61/156,759, filed on Mar. 2, 2009.

(51) Int. Cl.
*G06K 9/40* (2006.01)
*G06K 9/00* (2006.01)

(52) U.S. Cl.
CPC .................................. *G06K 9/00604* (2013.01)
USPC ......................... 382/117; 382/255; 348/208.4

(58) Field of Classification Search
USPC ................................ 382/117, 255; 348/208.4
See application file for complete search history.

(56) References Cited

U.S. PATENT DOCUMENTS

| | | | |
|---|---|---|---|
| 4,141,650 A | 2/1979 | Nishikawa et al. | 355/35 C |
| 5,291,560 A | 3/1994 | Daugman | 382/2 |
| 7,176,962 B2 * | 2/2007 | Ejima | 348/208.4 |
| 7,225,338 B2 | 5/2007 | Khan et al. | 713/186 |
| 7,336,806 B2 | 2/2008 | Schonberg et al. | 382/117 |
| 7,444,007 B2 | 10/2008 | Schonberg et al. | 382/117 |
| 7,593,550 B2 * | 9/2009 | Hamza | 382/117 |

(Continued)

FOREIGN PATENT DOCUMENTS

| | | |
|---|---|---|
| GB | 2 450 027 | 12/2008 |
| WO | WO 2007/129762 A2 | 11/2007 |

OTHER PUBLICATIONS

Facial Recognition System, http://cn.wikipedia.org/wiki/Facial_recognition_system. Iris Recognition, http://cn.wikipedia.org/wiki/Iris_recognition.

(Continued)

*Primary Examiner* — Kim Vu
*Assistant Examiner* — Michael Vanchy, Jr.
(74) *Attorney, Agent, or Firm* — Luis M. Ortiz; Kermit D. Lopez; Ortiz & Lopez, PLLC

(57) ABSTRACT

A feature-based method and system for blur estimation in eye images. A blur estimation can be performed from eye/iris images in order to produce de-blurred images that are more useful for biometric identification. The eye/iris region, in particular the edge between the iris and pupil regions, can be utilized. The pattern of shutter motion or a characterization of the optical system can be utilized. By capturing a burst of images, or a video stream, one can use eye position in the images before and after a given capture to predict the motion of the eye within that capture. Because the before/after image frames need only contain the information necessary to locate the eye, and need not contain sufficient information to perform matching, the capture of these images can be accomplished with a wider range of settings.

20 Claims, 3 Drawing Sheets

(56) References Cited

U.S. PATENT DOCUMENTS

| | | | |
|---|---|---|---|
| 7,933,464 B2 * | 4/2011 | Zhang et al. | 382/255 |
| 2002/0122133 A1 * | 9/2002 | Ejima | 348/362 |
| 2005/0094102 A1 * | 5/2005 | Cornsweet et al. | 351/221 |
| 2005/0249429 A1 * | 11/2005 | Kitamura | 382/255 |
| 2007/0036397 A1 | 2/2007 | Hamza | 382/117 |
| 2007/0092245 A1 | 4/2007 | Bazakos et al. | 396/427 |
| 2007/0122049 A1 | 5/2007 | Dowski, Jr. et al. | |
| 2007/0198850 A1 | 8/2007 | Martin et al. | 713/186 |
| 2007/0258706 A1 | 11/2007 | Raskar et al. | 396/52 |
| 2007/0258707 A1 | 11/2007 | Raskar et al. | 396/52 |

OTHER PUBLICATIONS

GB Search Report for GB Application 0922046.8 dated Apr. 16, 2010.

* cited by examiner

FEATURE-BASED METHOD AND SYSTEM FOR BLUR ESTIMATION IN EYE IMAGES

CROSS-REFERENCE TO PROVISIONAL APPLICATION

This application claims the benefit of priority based on U.S. Provisional Patent Application Ser. No. 61/156,759 filed Mar. 2, 2009, entitled "A Feature-Based Method and System for Blur Estimation in Eye Images." The above-referenced provisional patent application is hereby incorporated by reference herein in its entirety.

STATEMENT OF GOVERNMENT RIGHTS

The invention disclosed in this application was made with Government support under Contract Number W91CRB-09-C-0013 awarded by the U.S. Army Research Office. The Government has certain rights in the invention.

TECHNICAL FIELD

Embodiments are generally related to the field of security systems and biometric identification. Embodiments are also related to iris-based biometrics. Embodiments are additionally related to flutter shutter technology. Embodiments are additionally related to image-processing techniques, devices, and systems.

BACKGROUND OF THE INVENTION

Acquiring sharply-focused images of moving people or objects is a fundamental and challenging problem in several surveillance applications, particularly iris-based biometrics and face recognition. Biometric identification or verification of individuals can be performed on a number of input modalities. Several modalities such as iris and face recognition depend on image capture that, in different environments, may have degraded image quality. Image blur, due to subject motion or optical defocus, is an important type of degradation that is commonly encountered in biometric systems. When blur cannot be mitigated by changing the image capture technique, it becomes necessary to process blurred images in order to produce sharply-focused images that can be used for biometric identification.

Some deblurring approaches have been implemented. For example, a non-limiting example of a deblurring technology is disclosed in U.S. Patent Application Publication Serial No. US2007/0258707A1, entitled "Method and Apparatus for Deblurring Images," which published to Ramesh Raskar on Nov. 8, 2007, and is incorporated herein by reference. Another deblurring approach is disclosed in U.S. Patent Application Publication Serial No. US2007/0258706A1, entitled "Method for Deblurring Images Using Optimized Temporal Coding Patterns," which published to Ramesh Raskar, et al on Nov. 8, 2007, and is incorporated herein by reference.

While there are many techniques for performing deblurring, all such approaches require an estimate of the blur magnitude. Methods that remove motion blur additionally require estimates of the motion direction/path and the shape of the blur, which is related to the camera's shutter pattern and illumination characteristics. Methods that remove optical blur require estimates of both the magnitude and the shape of the blur, the shape being related to optical characteristics. In its full generality, the blur estimation problem is known to be ill-posed on a single image.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for a method and system for enhanced biometric identification.

It is another aspect of the present invention to provide for a feature-based method and system for blur estimation in eye images.

The aforementioned aspects and other objectives and advantages can now be achieved as described herein. A feature-based method and system for blur estimation in eye images is disclosed. A blur estimation can be performed from eye/iris images in order to produce de-blurred images that are more useful for biometric identification. The invention has been developed to exploit additional information that, while not available in the general case, is available when the blur estimation method/system is a component in a larger biometric system. Whereas the most general form of the blur estimation problem is ill-posed, three sources of information can be utilized, in addition to the image, to estimate blur in eye/iris images captured by our biometric systems.

First, the features of the eye/iris region, in particular the edge between the iris and pupil regions, can be utilized. Second, the pattern of shutter motion (for motion blur) or a characterization of the optical system (for defocus blur) can be utilized. Third, additional image information can be utilized. By capturing a burst of images, or a video stream, one can use eye position in the images before and after a given capture to predict the motion of the eye within that capture. Because the before/after image frames need only contain the information necessary to locate the eye, and need not contain sufficient information to perform matching, the capture of these images can be accomplished with a wider range of settings that result in a lower image quality.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
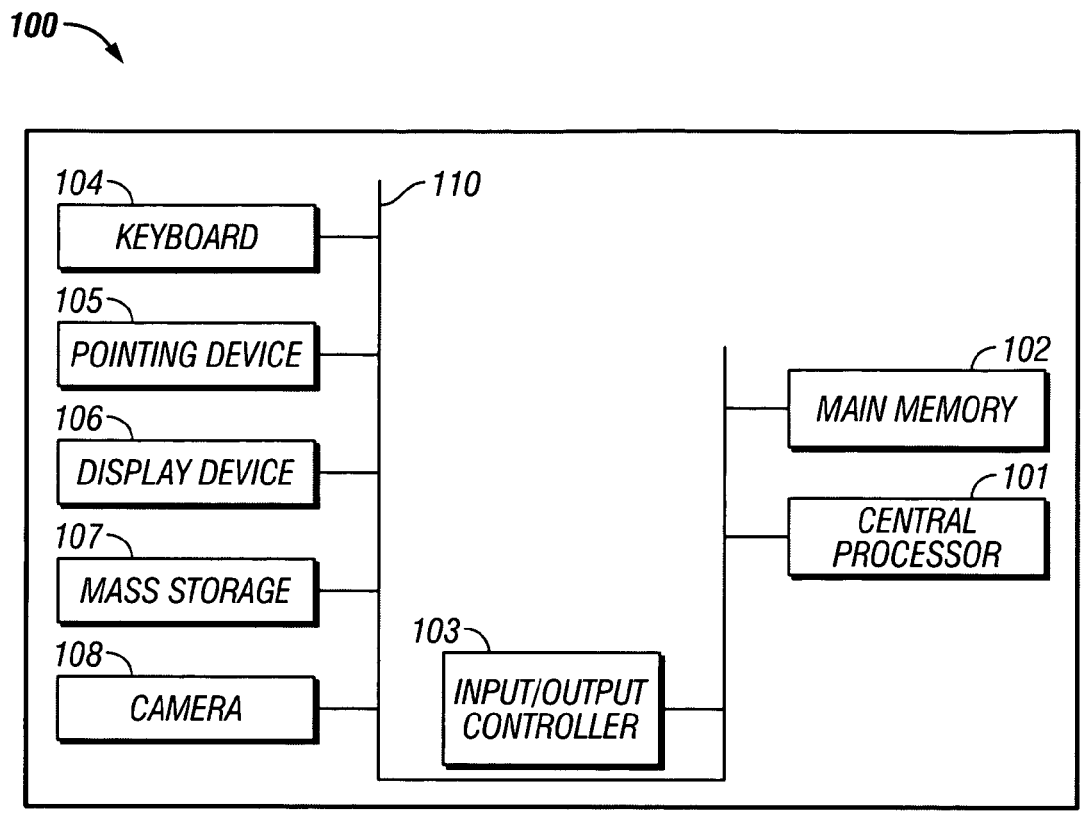
FIG. 1 illustrates a schematic view of a data-processing system in which the present invention may be embodied, including the use of a biometric reader, which may incorporate the use of, for example, a camera.
Figure 2:
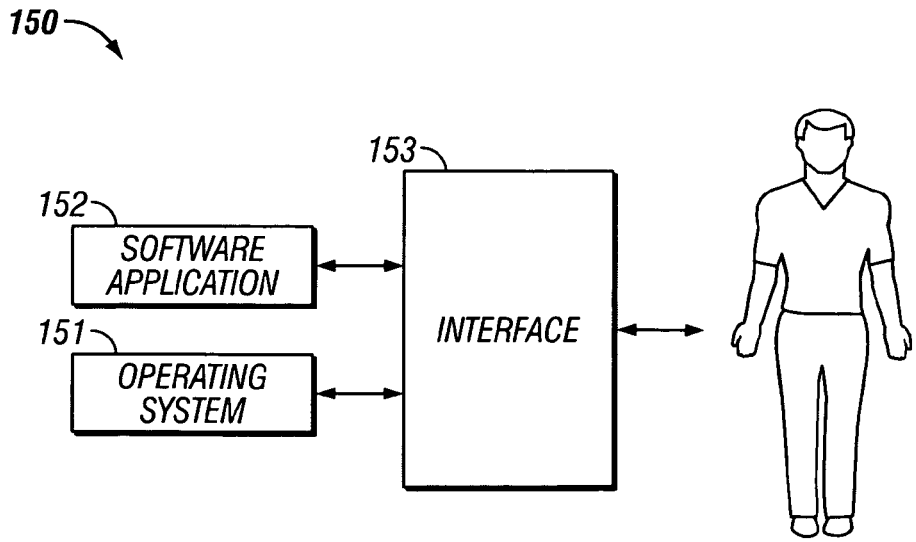
FIG. 2 illustrates a schematic view of a software system including an operating system, application software, and a user interface for carrying out the present invention.
Figure 3:
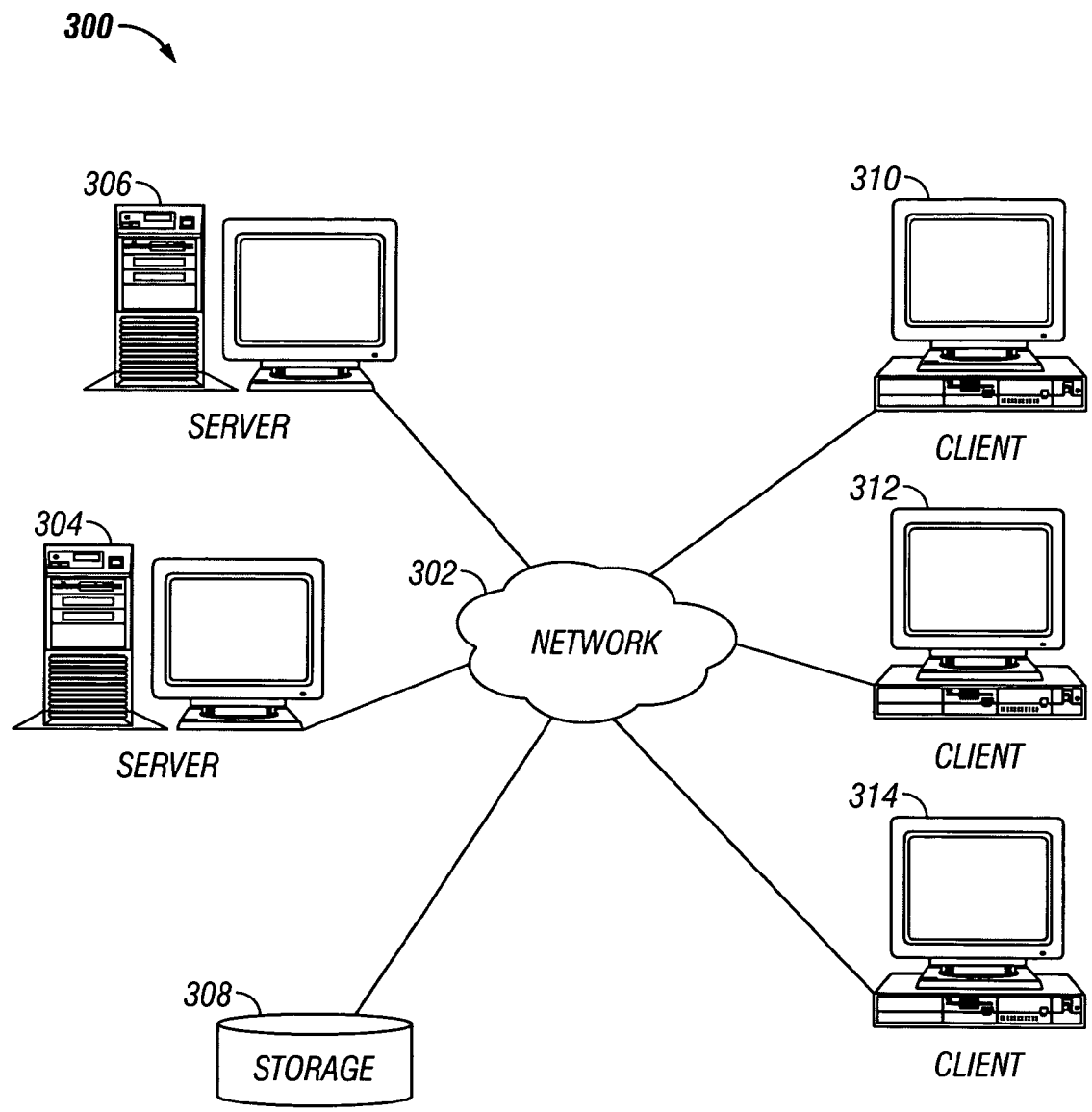
FIG. 3 illustrates a graphical representation of a network of data-processing systems in which aspects of the present invention may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage component 107 (e.g., hard disk). A camera 108 may be employed, which is capable of communicating with the data-processing system 100. Camera 108 may be implemented as, for example, a flutter shutter camera utilized in the context of a biometric reader, such as an Iris scanner or facial recognition device. The flutter shutter camera can be configured as a camera capable of capturing moving objects at an exposure time of, for example, over 50 milliseconds, like high speed motion cameras. Using a coded exposure sequence, the flutter shutter camera can recover, for example, text from a speeding car and sharpen images. As illustrated, the various components of the data-processing system 100 communicate through a system bus 110 or similar architecture.

FIG. 2 illustrates a computer software system 150 for directing the operation of the data-processing system 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152.

The interface 153, which is preferably a graphical user interface (GUI), can also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to the operating system 151 and interface 153. Application module 152, on the other hand, can include instructions, such as the various operations described herein with respect to the various components and modules described herein such as, for example, the methods 400 and 500 depicted respectively in FIGS. 4-5.

FIG. 3 illustrates a graphical representation of a network of data processing systems in which aspects of the present invention may be implemented. Network data processing system 300 can be provided as a network of computers in which embodiments of the present invention may be implemented. Network data processing system 300 contains network 302, which can be utilized as a medium for providing communications links between various devices and computers connected together within network data processing system 100. Network 302 may include connections such as wired, wireless communication links, fiber optic cables, USB cables, Ethernet connections, and so forth.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In some embodiments, network data processing system 300 may be the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 300 also may be implemented as a number of different types of networks such as, for example, a secure intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing system 100, computer software system 150, data-processing system 300, and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

The disclosed embodiments generally describe a feature-based method and system for blur estimation in eye images. A blur estimation can be performed from eye/iris images in order to produce de-blurred images that are more useful for biometric identification. The disclosed embodiments have been developed to exploit additional information that, while not available in the general case, is available when the blur estimation method/system is a component in a larger biometric system.

Whereas the most general form of the blur estimation problem is ill-posed, three sources of information can be utilized, in addition to the image, to estimate blur in eye/iris images captured by our biometric systems. First, the features of the eye/iris region, in particular the edge between the iris and pupil regions, can be utilized. Second, the pattern of shutter motion (for motion blur) or a characterization of the optical system (for defocus blur) can be utilized. Third, additional image information can be utilized. By capturing a burst of images, or a video stream, one can use eye position in the images before and after a given capture to predict the motion of the eye within that capture. Because the before/after image frames need only contain the information necessary to locate the eye, and need not contain sufficient information to perform matching, the capture of these images can be accomplished with a wider range of settings that result in a lower image quality.

Figure 4:
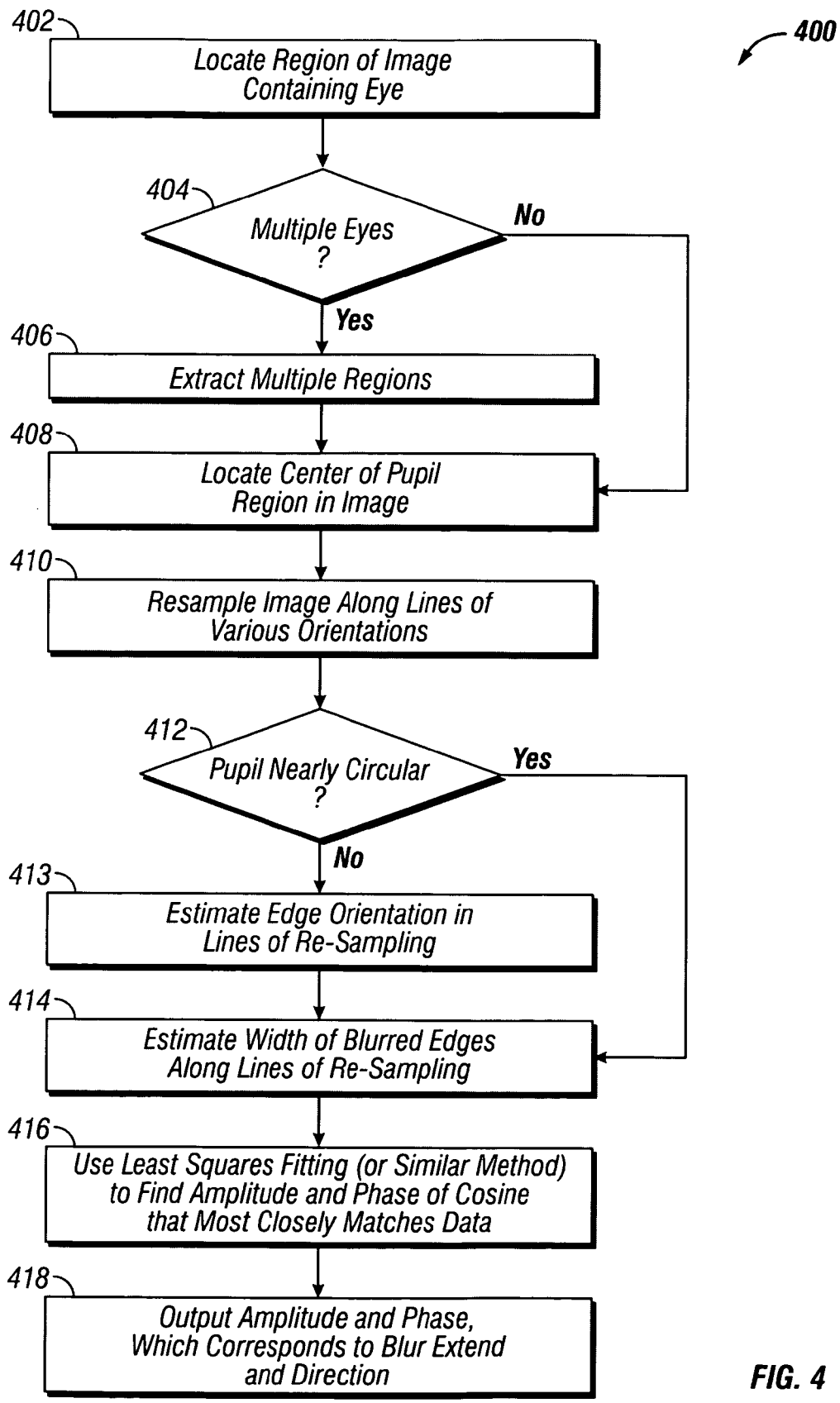
FIG. 4 illustrates a high-level flow chart of operations depicting logical operational steps of a method for blur estimation in eye images, in accordance with a preferred embodiment.

FIG. 4 illustrates a high-level flow chart of operations depicting logical operational steps of a method 400 for blur estimation in eye images, in accordance with a preferred embodiment. Note that method 400 and other methodologies disclosed herein can be implemented in the context of a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems.

It should be understood, therefore, that such signal-bearing media, when carrying or encoding computer readable instructions that direct method functions in the present invention, represent alternative embodiments of the present invention. Furthermore, it is understood that the present invention may be implemented by a system having means in the form of hardware, software, or a combination of software and hardware as described herein or their equivalent. Thus, the method 400, for example, described herein can be deployed as process software in the context of a computer system or data-processing system as that depicted in FIGS. 1-3.

The method 400 is based on the fact that the edge between the pupil and iris is a very useful feature for blur estimation because it provides information about all orientations over the range [0,360] degrees. Under motion blur, this edge will appear sharp in the directions orthogonal to motion and most blurred in the motion direction. By estimating the degree of blur at each orientation, it is possible to estimate both the motion direction and the severity of the blur. Simplistically, the blur direction can be estimated as the direction along which the blur width is maximal and the extent can be estimated as that maximal blur width. Due to sensor noise, errors in the estimate of the pupil center, and other confounding factors, this simplistic method is likely to perform erratically.

In order to improve robustness to such factors, our more sophisticated scheme uses the pairs of blur width and edge orientation as data that can be fit to a model. Because the blur width is expected to vary with the cosine of the difference between an orientation and the true direction of motion, we can fit the blur width data to a two-parameter model of amplitude and phase, the amplitude corresponding to the blur extent, and the phase corresponding to the blur direction. Method 400 thus constitutes a number of processing steps. As indicated at block 402, an operation can be processed for locating the region of the image containing an eye. If the image contains multiple eyes, as indicated at block 404, then multiple regions can be extracted, depicted at block 406; otherwise, the operation illustrated at block 408 can be processed.

With respect to each such region, the center of the pupil region in the image can be located, as described at block 408. Next, as illustrated at block 410, the image can be re-sampled along lines of various orientations, all of which pass through the pupil center. Following the processing of the operation depicted at block 410, a test can be performed, as illustrated at block 412, to determine if the pupil is nearly circular. If so, then the operation depicted at block 414 is processed and the operation illustrated at block 413 skipped. If not, then the operation depicted at block 413 is processed, following by the instructions depicted at block 414.

As indicated at block 413, the edge orientation in the lines of re-sampling can be estimated. The width of the blurred edges can also be estimated along these lines of re-sampling, as depicted at block 414. Note that the step illustrated at block 413 can be skipped when the pupil is nearly circular, as the orientation of the blurred edge will be orthogonal to the orientation of the corresponding line of re-sampling. Following the processing of the operation described at block 414, the operation depicted at block 416 can be processed. At this point, a collection of (edge orientation, blur width) pairs are generated that can be fit to a model.

As illustrated at block 416, a least squares curve fitting approach (or similar methodology) can be employed to determine the amplitude and phase of a cosine that most closely matches the data. Finally, as indicated at block 418, the method 400 outputs the amplitude and phase, which corresponds to the blur extent and direction, respectively.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" or "data-processing system" includes any data-processing apparatus including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for blur estimation in eye images, said method comprising:
   locating a region of an image containing an eye and identifying a center of a pupil region in said image;
   re-sampling said image along lines of various orientations, wherein each line of orientation thereof passes through a center of said pupil region, in order to generate data indicative of said image;
   testing said image to determine if said pupil is circular;
   estimating a blur width and an edge orientation of said lines of orientation according to said re-sampling; and
   fitting said data to a two parameter model of amplitude and phase according to a determination of an amplitude and a phase of a cosine that most closely matches said data, wherein said amplitude corresponds to a blur extent and said phase corresponds to a blur direction, with respect to said image.

2. The method of claim 1 further comprising estimating a width of blurred edges along each of said lines of various orientations.

3. The method of claim 1 further comprising:
 determining a number of eyes in said image; and
 extracting multiple regions from said image if said image contains multiple eyes.

4. The method of claim 1 further comprising utilizing a least squares curve fitting to determine said amplitude and said phase of said cosine that most closely matches said data.

5. The method of claim 1 wherein said data indicative of said model of said image comprises blur width data.

6. The method of claim 5 further comprising:
 compiling a two-parameter model of said amplitude and said phase; and
 fitting said blur width data to said two-parameter model, wherein said amplitude corresponds to said blur extent and said phase corresponds to said direction.

7. The method of claim 1 further comprising utilizing said amplitude and said phase of said cosine that most closely matches said data to perform a blur estimation and produce at least one de-blurred image for biometric identification of a subject associated with said image.

8. A system for blur estimation in eye images, said system comprising:
 a processor;
 a data bus coupled to the processor; and
 a computer-usable medium embodying computer code, the computer-usable medium being coupled to the data bus, the computer program code comprising instructions executable by the processor and configured for:
  locating a region of an image containing an eye and identifying a center of a pupil region in said image;
  re-sampling said image along lines of various orientations, wherein each line of orientation thereof passes through a center of said pupil region, in order to generate data indicative of said image;
  testing said image to determine if said pupil is circular;
  estimating an a blur width edge orientation of said lines of orientation according to said re-sampling; and
  fitting said data to a two parameter model of amplitude and phase according to a determination of an amplitude and a phase of a cosine that most closely matches said data, wherein said amplitude corresponds to a blur extent and said phase corresponds to a blur direction, with respect to said image.

9. The system of claim 8 wherein said instructions are further configured for estimating a width of blurred edges along each of said lines of various orientations.

10. The system of claim 8 wherein said instructions are further configured for:
 determining a number of eyes in said image; and
 extracting multiple regions from said image if said image contains multiple eyes.

11. The system of claim 8 wherein said instructions are further configured for utilizing a least squares curve fitting to determine said amplitude and said phase of said cosine that most closely matches said data.

12. The system of claim 8 wherein said data indicative of said model of said image comprises blur width data.

13. The system of claim 12 wherein said instructions are further configured for:
 compiling a two-parameter model of said amplitude and said phase; and
 fitting said blur width data to said two-parameter model, wherein said amplitude corresponds to said blur extent and said phase corresponds to said direction.

14. The system of claim 8 wherein said instructions are further configured for utilizing said amplitude and said phase of said cosine that most closely matches said data to perform a blur estimation and produce at least one de-blurred image for biometric identification of a subject associated with said image.

15. A non-transitory computer-readable recording medium for blur estimation in eye images, said non-transitory computer-readable recording medium embodying computer program code, said computer program code comprising computer executable instructions configured for:
 locating a region of an image containing an eye and identifying a center of a pupil region in said image;
 re-sampling said image along lines of various orientations, wherein each line of orientation thereof passes through a center of said pupil region, in order to generate data indicative of said image;
 testing said image to determine if said pupil is circular;
 estimating a blur width and an edge orientation of said lines of orientation according to said re-sampling; and
 fitting said data to a two parameter model of amplitude and phase according to a determination of an amplitude and a phase of a cosine that most closely matches said data, wherein said amplitude corresponds to a blur extent and said phase corresponds to a blur direction, with respect to said image.

16. The non-transitory computer-readable recording medium of claim 15 wherein said embodied computer code further comprises computer executable instructions configured for estimating a width of blurred edges along each of said lines of various orientations.

17. The non-transitory computer-readable recording medium of claim 15 wherein said embodied computer code further comprises computer executable instructions configured for:
 determining a number of eyes in said image; and
 extracting multiple regions from said image if said image contains multiple eyes.

18. The non-transitory computer-readable recording medium of claim 15 wherein said embodied computer code further comprises computer executable instructions configured for utilizing a least squares curve fitting to determine said amplitude and said phase of said cosine that most closely matches said data.

19. The non-transitory computer-readable recording medium of claim 15 wherein said data indicative of said model of said image comprises blur width data.

20. The non-transitory computer-readable recording medium of claim 19 wherein said embodied computer code further comprises computer executable instructions configured for:
 compiling a two-parameter model of said amplitude and said phase; and
 fitting said blur width data to said two-parameter model, wherein said amplitude corresponds to said blur extent and said phase corresponds to said direction.

* * * * *